United States Patent [19]

Chung et al.

[11] Patent Number: 5,614,309
[45] Date of Patent: Mar. 25, 1997

[54] COATED POLYPROPYLENE OR POLYETHYLENE USEFUL FOR MEMBRANES

[75] Inventors: Tai-Shung Chung, Randolph; Edward R. Kafchinski, Winfield; Rachel S. Kohn, Springfield; Frank J. Onorato, Jr., Phillipsburg, all of N.J.

[73] Assignee: Hoechst Celanese Corp., Somerville, N.J.

[21] Appl. No.: 885,801

[22] Filed: May 19, 1992

Related U.S. Application Data

[63] Continuation-in-part of Ser. No. 870,526, Apr. 17, 1992, Pat. No. 5,302,418.

[51] Int. Cl.⁶ .................................................. D02G 3/00
[52] U.S. Cl. .................... 428/375; 428/394; 428/396; 428/376; 428/398; 210/500.23
[58] Field of Search ................. 428/375, 394, 428/396, 398, 376, 400, 378; 427/175, 245, 354, 434.7; 210/500.23

[56] References Cited

U.S. PATENT DOCUMENTS

| | | | |
|---|---|---|---|
| 4,230,463 | 10/1980 | Henis et al. | 55/16 |
| 4,568,579 | 2/1986 | Watson | 428/35 |
| 4,575,385 | 3/1986 | Brook et al. | 55/158 |
| 4,654,265 | 3/1987 | Kamei et al. | 428/398 |
| 4,664,861 | 5/1987 | Anazawa et al. | |
| 4,756,932 | 7/1988 | Puri | 427/175 |
| 4,762,750 | 8/1988 | Giris et al. | 428/378 |
| 4,770,927 | 9/1988 | Effenberger et al. | 428/375 |
| 4,881,954 | 11/1989 | Bikson et al. | 55/16 |
| 4,992,332 | 2/1991 | Kamei et al. | 428/375 |
| 5,114,746 | 4/1992 | O'Leary et al. | 427/118 |
| 5,230,956 | 7/1993 | Cole et al. | 428/367 |

OTHER PUBLICATIONS

"Dictionary of Fiber and Textile Technology", copyright 1965, Gelanese Corp. p. 143.

*Primary Examiner*—Merrick Dixon
*Attorney, Agent, or Firm*—John M. Genova

[57] ABSTRACT

A polypropylene or polyethylene film or fiber coated with a maleic-acid grafted polypropylene or polyethylene copolymer layer over which is coated a layer of selective polymer. The copolymer securely bonds the selective polymer to the film or fiber. These fibers and films can be used in fluid separation membranes.

14 Claims, No Drawings

COATED POLYPROPYLENE OR POLYETHYLENE USEFUL FOR MEMBRANES

This application is a continuation-in-part of U.S. patent application Ser. No. 07/870,526, Attorney Docket Number 1458, filed Apr. 17, 1992 and entitled "Process For Surface-Modifying Polypropylene Or Polyethylene", now allowed Nov. 1, 1993 U.S. Pat. No. 5,302,418 Apr. 12, 1994.

BACKGROUND OF THE INVENTION

This invention relates to the field of fluid separation membranes and materials useful therein, especially to a polyolefin coated with a highly selective fluoropolymer.

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness.

Highly porous membranes tend to be very permeable, but do a poor job of separating fluids into their components. Less porous, dense membranes can be more selective, but at the cost of reduced throughput.

Asymmetric membranes generally have a thin, dense separation layer and a less dense, more permeable layer. These asymmetric membranes are often chosen for separation applications because they may provide a good combination of permeation and separation. Hollow fibers having a dense skin and a porous body can be used to make such membranes.

Unfortunately, many of the highly selective membrane materials, e.g. fluoropolymers, are relatively expensive. Some processes are also expensive, particularly if many process steps are needed. Furthermore, in some fibers the permeability, the separation factor, or both may be rather low. One solution is to use a porous, inexpensive material, such as polypropylene, and coat it with a thin layer of a fluoropolymer or other selective material. However, materials such as polypropylene may not adhere well to the selective material.

U.S. Pat. No. 4,230,463 issued to Henis, et al. describes multi-component membranes for gas separations wherein a porous membrane is coated with another substance. The coating is said to enhance the separation capability of the membrane.

U.S. Pat. No. 4,756,932 issued to Puri describes a process for making highly permeable coated composite hollow fiber membranes. The hollow fiber substrate is passed continuously through a polymeric coating solution and withdrawn through a coating die to form a uniform coating.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. patent application Ser. No. 738,996 filed on Aug. 1, 1991 by Chung, et al. describes an asymmetric hollow fiber consisting essentially of SIXEF™-Durene, a polyimide made from 2,2-bis[3,4-dicarboxyphenyl] hexafluoropropane dianhydride and 2,3,5,6-tetramethylphenylene diamine monomers.

The disclosures of the foregoing references are incorporated by reference herein.

SUMMARY OF THE INVENTION

The present invention is a polypropylene or polyethylene film or fiber coated with a maleic-acid grafted polypropylene or polyethylene copolymer layer over which is coated one or more layers of a selective polymer having at 25° C. an oxygen permeability of at least about 50 barrers and an oxygen/nitrogen selectivity of at least about 2.0. The copolymer securely bonds the selective polymer to the film or fiber. These fibers and films can be useful in fluid separation membranes because the polypropylene or polyethylene and the copolymer are porous, and because a thin fluid separation layer of a suitable polymer may be coated thereon.

It is an object of the present invention to provide a polypropylene or polyethylene film or fiber coated with a maleic-acid grafted polypropylene or polyethylene copolymer layer over which is coated a selective polymer.

It is another object of the present invention to provide selective polymer-coated polypropylene or polyethylene useful for fluid separation membranes.

A further object of the present invention is to provide a membrane material having a high oxygen/nitrogen separation factor and a good oxygen permeation rate.

Still another object of the present invention is to provide a relatively inexpensive membrane material in which the separation layer is a selective polymer.

Other objects and advantages of the present invention will be apparent to those skilled in the art from the following description and the appended claims.

DETAILED DESCRIPTION OF THE PREFERRED EMBODIMENTS

In one preferred embodiment of the present invention, a CELGARD® polypropylene fiber (made by Hoechst Celanese Corp., Charlotte, N.C.) has a coating of HOSTAPRIME® HC 5 maleic anhydride grafted low molecular weight polypropylene (made by Hoechst Celanese Corp., Charlotte, N.C.), having at least about 4% by weight maleic acid content, over which is a further coating of a fluoropolymer, e.g., SIXEF™-Durene which is a polyimide made by the Hoechst Celanese Corporation having repeating units derived from 2,3,5,6-tetramethyl phenylene diamine and 2,2-bis[3,4-dicarboxyphenyl] hexafluoropropane dianhydride monomers. The fluoropolymer layer is relatively thin (in the approximate range of from 0.1 micron to 2.0 microns thick) and uniform, as is desired for fluid separation applications. The middle layer of copolymer securely bonds the fluoropolymer to the fiber.

The copolymer may be applied to the fiber according to the following process:

A dope is made by dissolving the HOSTAPRIME® HC 5 copolymer powder in a solvent that is 80% xylene and 20% toluene by wt. at a temperature of at least about 100° C. to make a dope having about 2–15% solids content by weight, preferably about 3–10%. The CELGARD® polypropylene fiber is passed through this dope at a temperature of about 90°–110° C., preferably about 95°–105° C. After the fiber passes through the dope it is dried in a drying apparatus at about 100°–140° C. until substantially all the solvent has vaporized, producing a coated fiber.

The thickness of the copolymer coating may be varied as desired by controlling the solids content of the dope, and the residence time of the fiber in the dope bath (e.g., the fiber speed as it passes through, the length of the path the fiber travels in the dope bath, etc.). Generally, the thickness of the coating is about 0.1–25 microns, preferably about 0.5–10 microns.

To achieve a strong bond between the copolymer and the polypropylene fiber, it is necessary to maintain the dope at a sufficient temperature until the solvent vaporizes so that the copolymer will not prematurely precipitate; premature precipitation as the fiber passes through and/or exits the dope bath leads to poor adhesion of the copolymer to the polypropylene.

The temperature must never be high enough to cause any damage or decomposition of the fiber or the copolymer, nor to reach the boiling point of the solvent. However, it must be high enough to keep the copolymer in solution. Generally, a dope bath temperature of about 85°–110° C. is suitable, preferably about 90°–105° C. The drying column temperature should be at least as high and may be slightly higher, e.g. about 90°–150° C., preferably about 100°–130° C. The optimal temperatures for a given embodiment of the present invention depend on several variables, including the coating thickness, the coating speed, and the solid content of the dope.

The dope solvent may be any suitable solvent having one or more components which is capable of dissolving the copolymer, does not cause undesirable reactions, and is easily vaporized at a temperature low enough to avoid damaging the polypropylene or copolymer. Organic solvents having low polarity are preferred. Xylene and toluene are useful for this purpose, and mixtures of these solvents have been found to be very good solvents in the process of the present invention. Preferably, the solvent comprises about 30–100% xylene and about 0–70% toluene.

Although commercial polypropylene hollow fiber and copolymer have been used in the above embodiment, any polypropylene or polyethylene fiber, film, or other article may be coated by this process, and many similar maleic acid-grafted copolymers may be used. The copolymer should contain about 0.5–10% by wt. of units derived from maleic acid, and a melting point of about 140°–190° C. or less. These copolymers may be made by conventional methods for forming graft copolymers, e.g., by free radical addition of the maleic moiety to the polymer chain. The starting material for making such copolymers may include either maleic acid or maleic anhydride, or other maleic acid derivatives; the term "maleic acid-grafted" used herein encompasses all such copolymers. The chemical structure of these copolymers may be represented by the following:

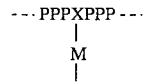

where P represents a repeating polymer chain unit, M represents the maleic moiety, and X is the polymer unit to which M is bonded.

The surface-modified polypropylene fiber or film obtained by the above-stated process is then coated with a layer of the fluoropolymer. This coating may be applied by any means known in the art. For example, the coating could be achieved in a manner analogous to that described above for coating the substrate with copolymer, i.e., dipping the fiber or film in a dope comprising the desired selective polymer.

Another preferred method for coating fiber with a selective polymer is to follow the procedure described in U.S. Pat. No. 5,076,916, the entire disclosure of which is incorporated herein by reference. Briefly, the copolymer coated fiber is passed through a separator device which applies a thin, uniform coating of the desired selective polymer in the form of a polymer solution. The solvent contained in this solution may be removed by evaporation or drying, leaving a selective polymer coating.

Although one may apply a single layer of selective polymer, multiple layers are also within the scope of this invention, regardless of the coating method chosen. Preferably, the total thickness of the selective polymer layer(s) is in the approximate range of from 0.1 micron to 2.0 microns.

The selective polymer of the present invention is any polymer that exhibits an oxygen permeability of at least about 50 barrers and an oxygen/nitrogen selectivity of at least about 2.0, when tested at 25° C. Oxygen/nitrogen selectivity is the ratio of the oxygen permeability divided by the nitrogen permeability. Examples of some preferred selective polymers include fluoropolymers such as SIXEF™-Durene, poly(tert-butyl acetylene), poly(trimethylsilyl propyne), silicon-containing polyimides, and the like.

Although it is possible to coat unmodified polypropylene or polyethylene with a selective polymer, unless the maleic acid-grafted copolymer is used according to this invention the selective polymer will not be securely bonded to the substrate. If the coated substrate is stressed, e.g., stretched, the selective polymer may not remain adhered to an unmodified substrate; however, the fiber and film of the present invention have superior resistance to stress.

The following non-limiting Examples illustrate several embodiments of the present invention. However, these Examples are only intended as illustrative, and the scope of the present invention is not limited to the embodiments illustrated herein; the scope of the present invention encompasses the entire subject matter covered by the appended claims.

EXAMPLE I

HOSTAPRIME® HC 5 maleic anhydride grafted low molecular weight polypropylene was dissolved in an 80/20 xylene/toluene solvent at 103° C. with stirring to form a dope comprising 3% HOSTAPRIME by weight. The dope remained stable at 95° C. as a CELGARD® microporous hollow fiber was passed through it. The fiber then passed out of the dope and into a drying column set at a temperature of 100°–110° C. The coating speed was 6 meters/min.

The HOSTAPRIME™ coating was 0.6 micron thick. The air flow rate through the coated fiber was 6% that of uncoated CELGARD® fiber.

The HOSTAPRIME-coated fiber was then further coated with SIXEF™-Durene polymer using the method described in U.S. Pat. No. 5,076,916; a dope of 3% SIXEF™-Durene in chloroform was prepared and coated onto the fiber using a separator device (fiber speed: 40 cm/min; dope deposition rate: 0.00146 cm³/sec). The fiber then passed into a 70° C. 60-cm long drying column to evaporate the chloroform. The selective layer was 1100 angstroms thick. A second layer of the selective polymer was coated over the first using the same procedure and conditions.

The coated fibers were used to make a test module comprising 50 fibers 20 cm long. The module was tested with oxygen and nitrogen at various pressures at 35° C. to test oxygen permeability and oxygen/nitrogen separation factor. The pressures were applied either from the shell or outer side of the hollow fibers or from the bore or inner side. The results are presented in Table I, in the order in which the tests were performed. These results show that the performance, as measured by separation factor, is quite good for pressures up to 90 psig (bore), but decreases at 150 psig (bore), at which pressure the fiber has been damaged.

TABLE I

| Pressure (psig/mode) | O₂ Permeance (barrers/cm) | Separation Factor |
| --- | --- | --- |
| 20.0 Shell | 49,600 | 4.7 |
| 20.0 Bore | 64,400 | 4.3 |
| 60.0 Bore | 68,100 | 4.3 |
| 20.0 Bore | 59,775 | 4.8 |
| 90.0 Bore | 76,393 | 5.0 |
| 150.0 Bore | 78,393 | 3.2 |
| 20.0 Bore | 67,965 | 3.4 |

EXAMPLE II

CELGARD® fiber was coated with HOSTAPRIME™ and SIXEF™-Durene as in Example I, except that three layers of the selective fluoropolymer were coated instead of two. These fibers were made into modules and tested, as in Ex. I, and the results are presented in Table II. As in Ex. I, the fibers perform well at pressures up to 90 psig.

TABLE II

| Pressure (psig/mode) | O₂ Permeance (barrers/cm) | Separation Factor |
| --- | --- | --- |
| 20.0 Shell | 53,700 | 4.6 |
| 20.0 Bore | 70,000 | 4.5 |
| 60.0 Bore | 73,300 | 4.1 |
| 20.0 Bore | 65,698 | 4.9 |
| 90.0 Bore | 83,554 | 5.0 |
| 150.0 Bore | 82,557 | 3.4 |
| 20.0 Bore | 73,063 | 3.8 |
| 20.0 Shell | 59,231 | 3.9 |

COMPARATIVE EXAMPLE

To compare the performance of fiber coated directly with a selective polymer to that of the fiber of Examples I and II, CELGARD® fiber was directly coated with three layers of SIXEF™-Durene, made into modules and tested, according to the procedure of Ex. I. The results are presented in Table III. These fibers became damaged at a pressure of only 90 psig, and suffered a precipitous drop in separation performance. These results indicate that coating fibers with a selective polymer without first coating a copolymer according to the present invention produces fibers that cannot withstand as much pressure without damage, i.e., the selective polymer is less strongly bonded and more easily separated from the fiber.

TABLE III

| Pressure (psig/mode) | O₂ Permeance (barrers/cm) | Separation Factor |
| --- | --- | --- |
| 20.0 Shell | 72,965 | 4.9 |
| 20.0 Bore | 97,319 | 5.2 |
| 60.0 Bore | 103,450 | 5.0 |
| 90.0 Bore | 124,903 | 2.7 |
| 60.0 Bore | 123,797 | 2.9 |

Many variations and equivalents of the present invention will occur to those skilled in the art. The present invention is not limited to the embodiments illustrated or described, but includes all the subject matter within the spirit and scope of the appended claims and of the foregoing disclosure.

We claim:

1. A fiber comprising a polypropylene or polyethylene substrate, a middle layer of maleic-acid grafted polypropylene or polyethylene copolymer bonded to said substrate, and an outer layer comprising a selective polymer having at 25° C. an oxygen permeability of at least about 50 barrers and an oxygen/nitrogen selectivity of at least about 2.0, said selective polymer being bonded to said middle layer.

2. A fiber according to claim 1 wherein said selective polymer is a fluoropolymer.

3. A fiber according to claim 2 wherein said fluoropolymer is a fluoropolyimide.

4. A fiber according to claim 3 wherein said polyimide has repeating units derived from 2,3,5,6-tetramethyl phenylene diamine and 2,2-bis[3,4-dicarboxyphenyl] hexafluoropropane dianhydride monomers.

5. A fiber according to claim 1 wherein said substrate is a hollow fiber.

6. A fiber according to claim 1 wherein said selective polymer layer has a thickness in the approximate range of from 0.1 micron to 2.0 microns.

7. A fiber according to claim 6 wherein said selective polymer is a fluoropolymer.

8. A fiber according to claim 7 wherein said fluoropolymer is a fluoropolyimide.

9. A fiber according to claim 1 wherein said middle layer has a thickness in the approximate range of from 0.1 micron to 25 microns.

10. A fiber according to claim 1 wherein said middle layer has a thickness in the approximate range of from 0.5 micron to 10 microns.

11. A fiber comprising a polypropylene or polyethylene substrate, a middle layer of maleic-acid grafted polypropylene or polyethylene copolymer bonded to said substrate, wherein said middle layer has a thickness in the approximate range of from 0.1 micron to 25 microns, and an outer layer of a selective fluoropolymer having at 25° C. an oxygen permeability of at least about 50 barrers and an oxygen/ nitrogen selectivity of at least about 2.0, said selective fluoropolymer being bonded to said middle layer and having a thickness in the approximate range of from 0.1 micron to 2.0 microns.

12. A fiber according to claim 11 wherein said fluoropolymer is a fluoropolyimide.

13. A fiber according to claim 12 wherein said polyimide has repeating units derived from 2,3,5,6-tetramethyl phenylene diamine and 2,2-bis[3,4-dicarboxyphenyl] hexafluoropropane dianhydride monomers.

14. A fiber according to claim 11 wherein said substrate is a hollow fiber.

* * * * *